P. O'MEARA.
METALLIC PACKING.
APPLICATION FILED FEB. 19, 1915.
1,256,248.
Patented Feb. 12, 1918.
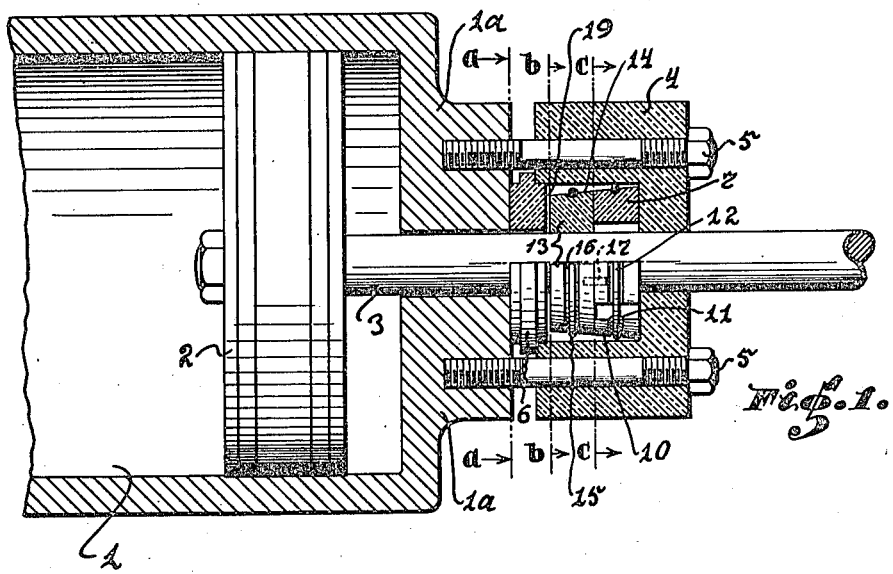
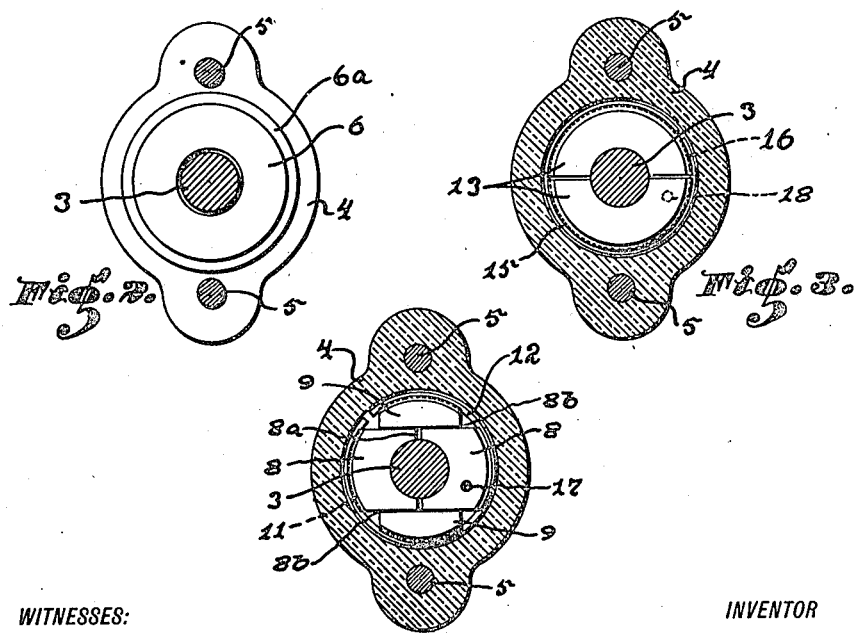
WITNESSES:
C. A. Ellis
R. E. Bruckner
INVENTOR
P. O'Meara
BY John M. Spillman
ATTORNEY

UNITED STATES PATENT OFFICE.

PATRICK O'MEARA, OF SANTA RITA, NEW MEXICO.

METALLIC PACKING.

1,256,248.  Specification of Letters Patent.  Patented Feb. 12, 1918.

Application filed February 19, 1915. Serial No. 9,467.

*To all whom it may concern:*

Be it known that I, PATRICK O'MEARA, a citizen of the United States, residing at Santa Rita, in the county of Grant and State of New Mexico, have invented certain new and useful Improvements in Metallic Packings, of which the following is a specification.

My invention has relation to a metallic packing for piston rods and valve stems and in such connection it relates more particularly to the construction and arrangement of such a packing.

In the carrying out of my invention there is provided a gland held to position by studs or bolts and having its box shaped interior closed by an annular metallic disk flanged on its exterior, the gland resting upon said flange and in the interior of the gland upon the rod or stem traversing said gland is arranged the packing rings. These rings have their peripheries tapering so as to be larger in diameter at that side which faces away from the valve chamber or piston chamber and each ring is made of two or more sections being divided diametrically in one instance and both diametrically and transversely in the other.

These sections when assembled are held to position by a flexible securing means, preferably a metallic wire, surrounding each ring peripherally being for this purpose seated in a groove extending peripherally around all the sections.

By reason of this construction the steam or fluid under pressure which leaks or is exhausted from the valve or cylinder around the stem or rod will enter the box of the gland and press upon the tapered exterior of the packing rings to force the same down upon the stem or rod and make a steam or vapor tight joint therewith. On the return stroke for instance of a piston and its rod, this pressure upon the exterior or periphery of the packing rings is relieved and the sections of said rings are permitted to relax under their flexible binding means to permit easy movement of the rod.

The nature and scope of my invention will be more fully understood from the following description taken in connection with the accompanying drawings forming part hereof, in which Figure 1 is a view partly in cross section of a metallic packing embodying main features of my invention the same being illustrated as adapted for use with the gland and stuffing box of a cylinder and piston rod.

Fig. 2 is a cross sectional view taken on lines $a$—$a$ of Fig. 1 to illustrate the gland and its end closing disk.

Fig. 3 is a similar view taken on line $b$—$b$ of Fig. 1, but illustrating the arrangement and construction of one of the packing rings, and Fig. 4 is a similar view taken on line $c$—$c$ of Fig. 1, and illustrating the arrangement and construction of the second packing ring.

Referring to the drawings 1 represents a cylinder and 2 the piston traversing the same, said piston 2 having a rod 3 traversing the end $1^a$ of the cylinder and also a gland 4 which is secured by studs or bolts 5 to the cylinder 1 to constitute the outer member of a stuffing box for the piston rod 3. Between the end $1^a$ of the cylinder and the adjacent open end of the gland 4 is interposed an annular metallic disk 6 having a peripheral flange $6^a$ against which the gland 4 abuts, the body of the disk 6 being traversed by the rod 3 and entering the gland 4 to form a closure for said gland 4. The disk 6 forms a joint between the stuffing box and the cylinder but does not form a relatively tight joint with the rod 3 at the point where said rod 3 traverses said disk 6. Within the box formed by the gland 4 and its end closure 6 are arranged the metallic packing rings. In the preferred arrangement these rings are two in number. The first ring 7— which is adjacent to the closed end of gland 4—is formed of four sections arranged in pairs 8 and 9. Of these sections 8, 8 are formed by cutting the ring diametrically as at $8^a$ and transversely as at $8^b$, $8^b$. The sections 8, 8 have an opening fitting the stem or rod 3. The other sections 9, 9 are capping pieces placed upon the sections 8, 8 to cover the joint made by cutting sections 8, 8 diametrically. The parts 8 and 9 when assembled form approximately a ring the periphery whereof is tapered as at 10 (see Fig. 1) and in this peripheral portion 10 is formed a groove 11 extending peripherally around the assembled sections. A flexible securing means, preferably a wire 12 made of spring metal, inserted in the groove 11 serves to bind the parts 8 and 9 together and to hold the sectioned ring more or less tightly upon the stem or rod 3.

The second packing ring 13 is made of two sections by dividing the ring diametrically and the exterior or periphery is tapered as at 14 and these sections are bound together by a flexible securing means, preferably a wire 15 made of spring metal inserted in the groove 16 extending peripherally around the assembled sections 13.

The two rings 7 and 13 form, when assembled, a frusto-conical body the taper of the exterior being from the gland 4 downwardly toward the closure 6. Thus the face of ring 13 which abuts upon the contiguous face of ring 7 is of a diameter smaller than the opposite face of ring 13 and coequal to the abutting face of ring 7 and the face of ring 7 which abuts upon the gland 4 is of a diameter larger than the opposite face of the ring 7 which abuts upon the face of ring 13.

To secure the two rings 7 and 13 together when properly assembled within gland 4, a dowel pin 17 formed on a contiguous face of one ring say 7 is adapted to enter a recess 18 formed in the contiguous face of the other ring 13 for instance.

The two rings 7 and 13 when in the gland 4 do not abut tightly upon the end closure 6 but some space 19 is formed at that point communicating on the one hand with the space between the tapered periphery of the two rings and on the other hand with the central space between the closing disk 6 and the piston rod 3.

When upon the return stroke of piston 2 the charge of fluid or vapor in the cylinder is compressed back of the piston 2, a portion of the fluid or vapor is forced through space 19 to the tapered periphery of the rings 7 and 13. The pressure thus brought to bear upon the assembled sections of the rings causes the rings to bind tightly upon the rod 3 to make a fluid tight joint within the gland. On the forward stroke of the piston 2, the pressure upon the periphery of the rings 7 and 13 is relieved and the sections of said rings may spread slightly to permit of the relatively free movement of the rod 3 in the gland and stuffing box.

Having thus described the nature and objects of my invention what I claim as new and desire to secure by Letters Patent, is:—

In a metallic packing for piston rods, a gland, an annular flanged disk interposed between the cylinder head and gland, said disk loosely fitting the piston rod and forming a closure for the open end of the gland, metallic packing rings inclosed by the gland and having tapered peripheries, the contacting faces of the rings being coequal in diameter to present a continuous tapered periphery of both rings converging toward said disk, one of said rings being divided diametrically and separated by a space from said disk, and the other of said rings being divided both diametrically and transversely into sections and springs holding said rings snugly to the piston rod.

In testimony whereof I have signed my name to this specification in the presence of two subscribing witnesses.

PATRICK O'MEARA.

Witnesses:
JOHN I. MILLS,
ED MARTIN FLYNN.